Figure 1:
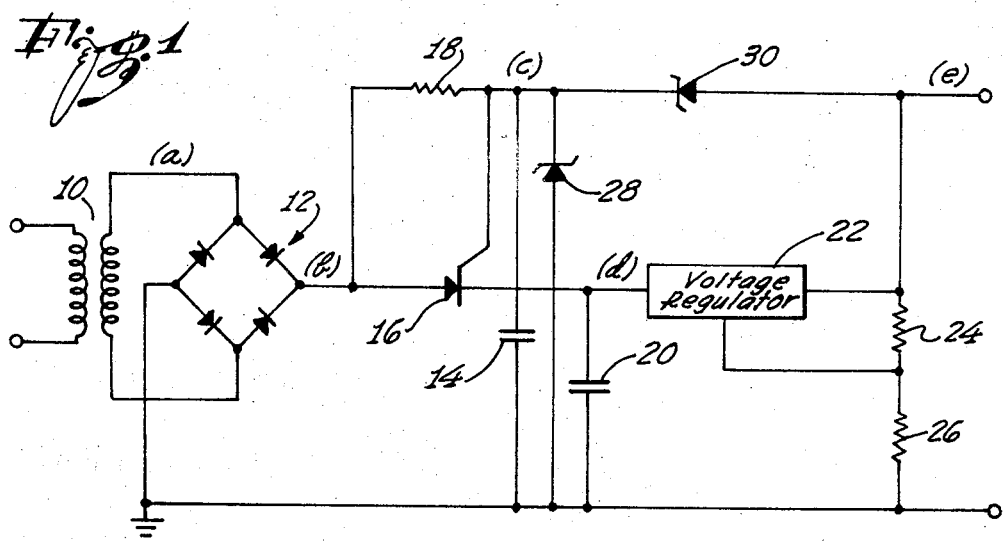

United States Patent [19]

Scantlin

[11] 3,769,573

[45] Oct. 30, 1973

[54] SERIES REGULATOR HAVING REGULATION FOR VARIATIONS IN LINE VOLTAGE AND LOAD DEMAND

[75] Inventor: John R. Scantlin, Los Angeles, Calif.

[73] Assignee: Transaction Technology, Inc., Los Angeles, Calif.

[22] Filed: Aug. 31, 1972

[21] Appl. No.: 285,504

[52] U.S. Cl............. 323/9, 317/16, 317/33 VR, 323/22 SC, 323/25, 323/36
[51] Int. Cl.............................................. G05f 1/58
[58] Field of Search............................. 321/16, 18; 323/22 T, 22 SC, 23, 25, 36; 317/16, 33 VR

[56] References Cited
UNITED STATES PATENTS
3,419,789  12/1968  Gately.............................. 323/22 T OTHER PUBLICATIONS
Pohl, "Zener in Preregulator Limits Series Transistor Dissipation," Electronics, Vol. 42, No. 22, Oct. 27, 1969, TK7800E58, page 98.

Primary Examiner—A. D. Pellinen
Attorney—George Fred Smyth et al.

[57] ABSTRACT

A voltage regulator for use with a series regulator having a relatively constant output voltage with a range of input voltages and including a capacitor coupled across the input to the series regulator to filter and store the input to the series regulator, a source of d-c voltage, and a switch having a gating input interconnecting the source of d-c voltage with the capacitor for providing switching of the source of d-c voltage to the capacitor to charge the capacitor when the voltage across the capacitor falls below a predetermined level. A pair of Zener diodes one of which is connected between the output of the series regulator and gating input and the other of which is connected between the gating input and the low side of the capacitor provides protection against overload and over voltage conditions. A capacitor is connected between the junction of the Zener diodes and the low side of the capacitor and with the charging rate of the capacitor controlling the point of switching.

10 Claims, 2 Drawing Figures

SERIES REGULATOR HAVING REGULATION FOR VARIATIONS IN LINE VOLTAGE AND LOAD DEMAND

The present invention is directed to a regulated power supply which provides regulation in accordance with changes in both line voltage and load demand. In addition, the power supply of the present invention provides for sufficient storage of power so as to continue the supply of power during a transient off condition, such as a transient off condition of ½ second to 1 second. The power supply of the present invention also provides protection in case there is a load short circuit or line over voltage conditions.

There is generally available from a number of manufacturers, voltage regulators known as "series regulators" which series regulators may be fabricated on a single silicon chip. As an example, a 5 volt regulator manufactured by National Semi-conductor Corporation of 2,900 Semiconductor Dr., Santa Clara, California, and designated as Model No. LM 309K, is a complete series voltage regulator fabricated on a single silicon chip. This regulator provides for an output voltage of approximately 5 volts for a range of input voltages between 7 to 35 volts.

This type of regulator although providing adequate regulation for some demands is not adequately protected for large changes in line voltage and load demand. In addition, this type of voltage regulator does not provide for a continuation of power for short transient line off conditions. Also, if the output is shorted or if there is a high load demand, this type of regulator could be damaged and would require replacement even after the high load condition or load short circuit condition is corrected. The present invention provides for protection of the regulator against such occurrences.

Specifically, applicant provides for a capacitor located across the input to the 5-volt series regulator and with the charging of the input capacitor gated so as to control the charging of the capacitor in accordance with the load demand. This gating of the charging of the input capacitor is controlled by an SCR.

The system also includes a pair of Zener diodes to protect both the input capacitor and the 5-volt series regulator. The output from the series regulator is therefore regulated both for variations in line voltage and load demand and there is a sufficient storage in the input capacitor to provide for an output to endure transient line off conditions such as ½ second to 1 second. The voltage regulator of the present invention also has short circuit protection so as to ensure that the 5-volt series regulator will not draw an excessive output even though the load demand is excessively high or shorted.

Figure 2:
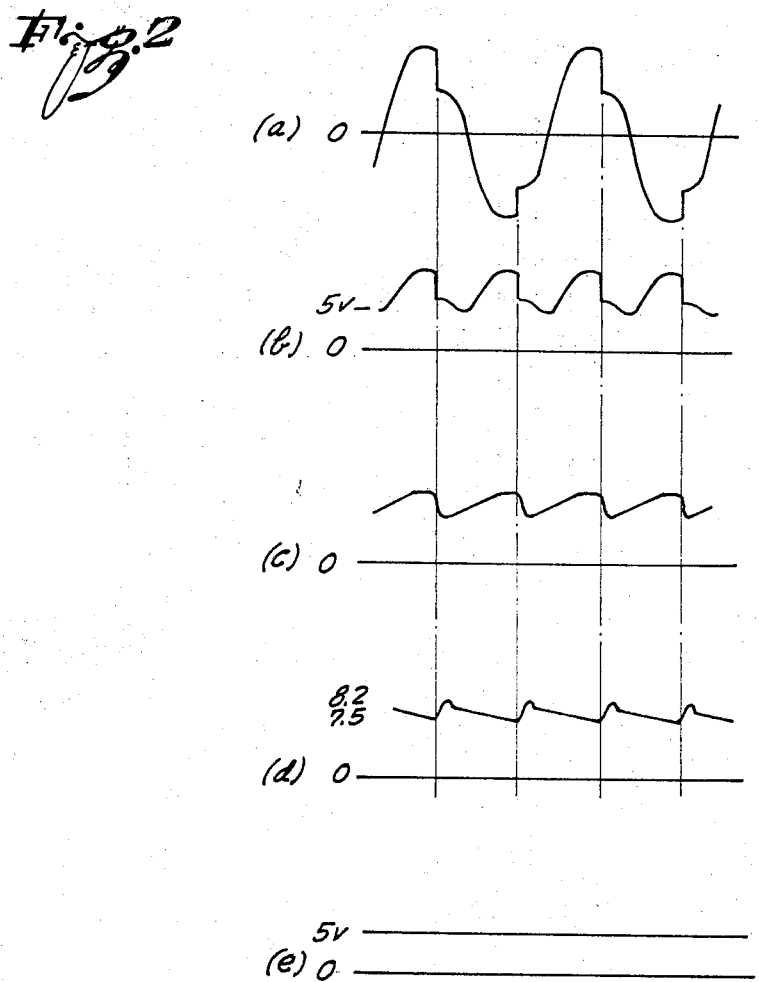

A clearer understanding of the invention will be had to the following description and drawings wherein FIG. 1 illustrates a schematic of a voltage regulator of the present invention; and FIG. 2 is a series of waveforms at various points within the schematic of FIG. 1.

In FIG. 1, a schematic of a voltage regulator constructed in accordance with the teachings of the present invention is shown. Normally, the external line voltage is applied to a step-down transformer 10 and the line voltage can vary anywhere between 90 to 135 volts. The output from the step-down transformer 10 should be approximately 10-½ volts a-c, if the input to the transformer 10 is approximately 115 volts. The output from the step-down transformer 10 is applied to a full wave bridge rectifier 12 so as to provide a d-c output in accordance with the input.

The output from the bridge rectifier 12 is coupled to one side of an SCR 16 and is also coupled through a resistor 18 to the gate of the SCR 16. In addition, a capacitor 14 is coupled between the gate of the SCR 16 and ground. The output of the SCR 16 is applied to a large capacitor 20. The capacitor 20 is coupled across the input of a voltage regulator 22. The voltage regulator provides for a series regulation of an input voltage such as an input voltage having a range of 7 to 35 volts and provides for a nominal 5-volt output voltage. This type of voltage regulator is manufactured by a number of companies and specifically a voltage regulator such as Model No. LM 309K manufactured by the National Semiconductor Corporation may be used.

The output from the voltage regulator 22 is coupled across a pair of resistors 24 and 26 and these resistors are used to adjust the specific value of the voltage output from the regulator 22. The schematic of FIG. 1 also includes a pair of Zener diodes 28 and 30 to provide protection for the capacitor 20 and for the series regulator 22.

The series voltage regulators such as Model No. LM 309K, manufactured by National Semiconductor Corporation, although providing adequate regulation under normal conditions, do not provide adequate regulation for large changes in line voltage or for large changes in load demand. Also, the series regulators may draw excessive current for high load conditions or when the output is short-circuited. In addition, if a transient line off condition occurs, the series regulators currently in use do not provide for a continuation of power during the time of the transient line off condition. The present invention overcomes these difficulties of the prior art series regulators in the following manner:

The SCR 16 provides switching of the d-c from the bridge rectifier 12 to the capacitor 20 when the voltage across the capacitor 20 drops below a particular level. This occurs when the voltage at the gate of the SCR 16 is positive relative to the voltage across the capacitor 20 and the capacitor 20 is negative with respect to the bridge rectifier 12 so as to switch the SCR on to supply an input signal to the capacitor to recharge the capacitor 20. The switching point of the SCR 16 is also controlled by the charging of the capacitor 14 until the capacitor 20 is positive with respect to the bridge rectifier 12. As the load increases, the capacitor 14 controls the SCR to fire at an earlier point and thereby supply more charging current to the capacitor 20. The series regulator 22 is therefore protected against line over-voltage conditions since the voltage across the capacitor 20 remains relatively constant and the capacitor 20 is only charged with the necessary charging current. In the event a transient line off condition occurs where there is no voltage input to the transformer 10, the capacitor 20 has a sufficiently large storage capacity so as to supply the series regulator 22 with sufficient power to endure transient off conditions up to 1 second.

The Zener diodes 28 and 30 protect the capacitor 20 and series regulator 22 in the following manner. The Zener diode 28 limits the dissipation across the series regulator 22 by limiting the voltage at the input to the series regulator 22 abd also limits the peak voltage across the capacitor 20 so as to protect the capacitor. In addition, if the output from the series regulator 22 is shorted or there is an excessively high demand, the voltage across the capacitor 20 is limited by the Zener diode 30, so that the series regulator 22 will not draw an excessive output current. Normally, when an output short circuit or high load condition occurs, the series regulators 22, as currently used, allow for an excessive output current which could ultimately damage the series regulators. The present invention provides protection from such excessive current draw.

The specific operation of the switching portion of the system which allows for the capacitor 20 to have its input gated in accordance with demand can be more clearly shown with reference to FIG. 2 which illustrates a series of waveforms which are referenced to particular locations in the schematic of FIG. 1.

It can be seen now that point a is merely a phase-loaded sine wave which has been stepped down in voltage from the line voltage of approximately 115 volts. Point b illustrates a fully rectified phase-loaded sine wave which is biased at approximately 5 volts since this point is not isolated from the output and is a series of positive going pulses which have an average d-c level. Point c illustrates the switching control signal at the gate of the SCR. It is to be appreciated that the Zener diode 28 in association with the capacitor 14 controls the switching of the power to the capacitor 20.

For example, the Zener 28 will limit the peak voltage at point c and therefore limits the voltage across the capacitor 20. The Zener 30 limits the voltage across the capacitor 20 when the series regulator output is shorted or has an excessively high load so that the regulator 22 will not draw an excessive current. The capacitor 14 is used to equalize load on the transformer 10 by providing a charging ramp which controls the firing point of the SCR.

It can be seen that the gate terminal of the SCR 16 as shown at point c will fire at each line input half cycle and with the point of firing dependent upon the need of the capacitor 20 to receive power to maintain its charge. The point d illustrates the voltage across the capacitor which is shown to vary between a low value of approximately 7.5 volts at which time the SCR fires to allow capacitor 20 to charge to a high value of approximately 8.2 volts. This high value is controlled by Zener 28. It can be seen that the input to the regulator 22 varies between these two values but is not varied with changes in line voltage or high load demand. In addition, the capacitor 20 is sufficiently large in storage capacity so as to provide an input to the series regulator 22 even with transient line off conditions of up to 1 second. The series regulator 22 is protected from output short circuit or high load conditions since the switching of power to the capacitor 20 is regulated by the Zener diode 30 as the Zener diode 30 voltage is lower than that of Zener diode 28, thereby reducing the charging of capacitor 20, so that current flow through the series regulator 22 cannot be excessive to cause damage to the series regulator. The point e shows the output of the series regulator 22 to be constant at 5 volts.

Although the invention has been shown with reference to a particular embodiment, it is to be appreciated that various adaptations and modifications may be made and the invention is only to be limited by the appended claims.

I claim:

1. A voltage regulator for use with a series regulator having a relatively constant output voltage with a range of input voltages and including
    capacitance means coupled across the input to the series regulator to filter and store the input to the series regulator,
    a source of d-c voltage,
    switching means including a gating input and with the switching means interconnecting the source of a d-c voltage with the capacitance means for providing switching of the source of d-c voltage to the capacitance means to charge the capacitor when the voltage across the capacitance means falls below a predetermined level, and
    a pair of Zener diodes one of which is connected between the output of the series regulator and the gating input and the other of which is connected between the gating input and the low side of the capacitance means to provide protection against overload and line over-voltage conditions.

2. The voltage regulator of claim 1 wherein the switching means is an SCR.

3. The voltage regulator of claim 1 wherein the capacitance means has sufficient storage capacity to provide an input signal to operate the series regulator upon the discontinuance of the source of d-c voltage for line transient periods.

4. The voltage regulator of claim 1 wherein the switching means is an SCR having its anode connected to the source of d-c voltage, its cathode connected to the high side of the capacitance means and its gate connected to the junction of the Zener diodes.

5. The voltage regulator of claim 4 additionally including a capacitor connected between the junction of the back-to-back Zener diodes and the low side of the capacitance means and with the charging rate of the capacitor controlling the firing point of the SCR.

6. A voltage regulator for providing a relatively constant output voltage from a range of input voltages, including
    a source of d-c voltage,
    a switching means having a gating input and with the switching means coupled to the source of d-c voltage,
    a capacitance means coupled to the switching means and with the switching means providing coupling of the source of d-c voltage to the capacitance means to charge the capacitance means when the voltage across the capacitance means falls below a predetermined level,
    a series regulator coupled to the capacitance means to receive the voltage across the capacitance means as an input and for providing a voltage regulated output, and
    a pair of Zener diodes one of which is connected between the output of the series regulator and the gating input and the other of which is connected between the gating input and the low side of the capacitance means to provide protection against overload and line over voltage conditions.

7. The voltage regulator of claim 6 wherein the switching means is an SCR.

8. The voltage regulator of claim 6 wherein the capacitance means has sufficient storage capacity to provide an input signal to operate the series regulator upon the discontinuance of the source of d-c voltage for line transient periods.

9. The voltage regulator of claim 7 wherein the switching means is an SCR having its anode connected to the source of d-c voltage, its cathode connected to the high side of the capacitance means and its gate connected to the junction of the Zener diodes.

10. The voltage regulator of claim 9 additionally including a capacitor connected between the junction of the Zener diodes and the low side of the capacitance means and with the charging rate of the capacitor controlling the firing point of the SCR.

* * * * *